(12) United States Patent
Oskooei et al.

(10) Patent No.: US 8,042,752 B2
(45) Date of Patent: Oct. 25, 2011

(54) NOZZLE REPAIR TO REDUCE FRETTING

(75) Inventors: Saeid Oskooei, Toronto (CA); Nicholas Hope, Campbellville (CA)

(73) Assignee: Pratt & Whitney Canada Corp., Longueuil (CA)

( * ) Notice: Subject to any disclaimer, the term of this patent is extended or adjusted under 35 U.S.C. 154(b) by 281 days.

(21) Appl. No.: 12/389,651

(22) Filed: Feb. 20, 2009

(65) Prior Publication Data

US 2010/0213290 A1    Aug. 26, 2010

(51) Int. Cl.
*A62C 31/02* (2006.01)

(52) U.S. Cl. .......................... 239/589; 239/1

(58) Field of Classification Search .............. 239/589, 239/589.1, 592, 5; 60/796
See application file for complete search history.

(56) References Cited

U.S. PATENT DOCUMENTS

| | | | |
|---|---|---|---|
| 5,540,547 A | 7/1996 | Cole | |
| 5,996,352 A | 12/1999 | Coughlan et al. | |
| 6,026,645 A * | 2/2000 | Stokes et al. | 60/737 |
| 6,038,862 A | 3/2000 | Melman et al. | |
| 6,141,968 A | 11/2000 | Gates et al. | |
| 6,145,762 A | 11/2000 | Orloff et al. | |
| 6,253,555 B1 | 7/2001 | Willis | |
| 6,272,842 B1 | 8/2001 | Dean | |
| 6,282,904 B1 * | 9/2001 | Kraft et al. | 60/739 |
| 6,434,945 B1 | 8/2002 | Mandai et al. | |
| 6,672,073 B2 | 1/2004 | Wiebe | |
| 6,705,087 B1 | 3/2004 | Ohri et al. | |
| 6,820,431 B2 | 11/2004 | Mcmanus et al. | |
| 6,886,346 B2 | 5/2005 | Sobieski et al. | |
| 7,197,877 B2 | 4/2007 | Moraes | |
| 7,316,117 B2 | 1/2008 | Ohri | |
| 2007/0000228 A1 | 1/2007 | Ohri et al. | |
| 2007/0039325 A1 | 2/2007 | Lehtinen et al. | |

* cited by examiner

*Primary Examiner* — Davis Hwu

(74) *Attorney, Agent, or Firm* — Norton Rose OR LLP

(57) ABSTRACT

A method repair for reducing fretting of a fuel nozzle of a gas turbine engine, including attaching at least one stiffening element to an outer surface of a portion of a stem member of the fuel nozzle, with a size and shape of the at least one stiffening element being selected such that a first natural frequency of the fuel nozzle with the at least one stiffening element attached thereto is outside the engine running frequency range.

19 Claims, 5 Drawing Sheets

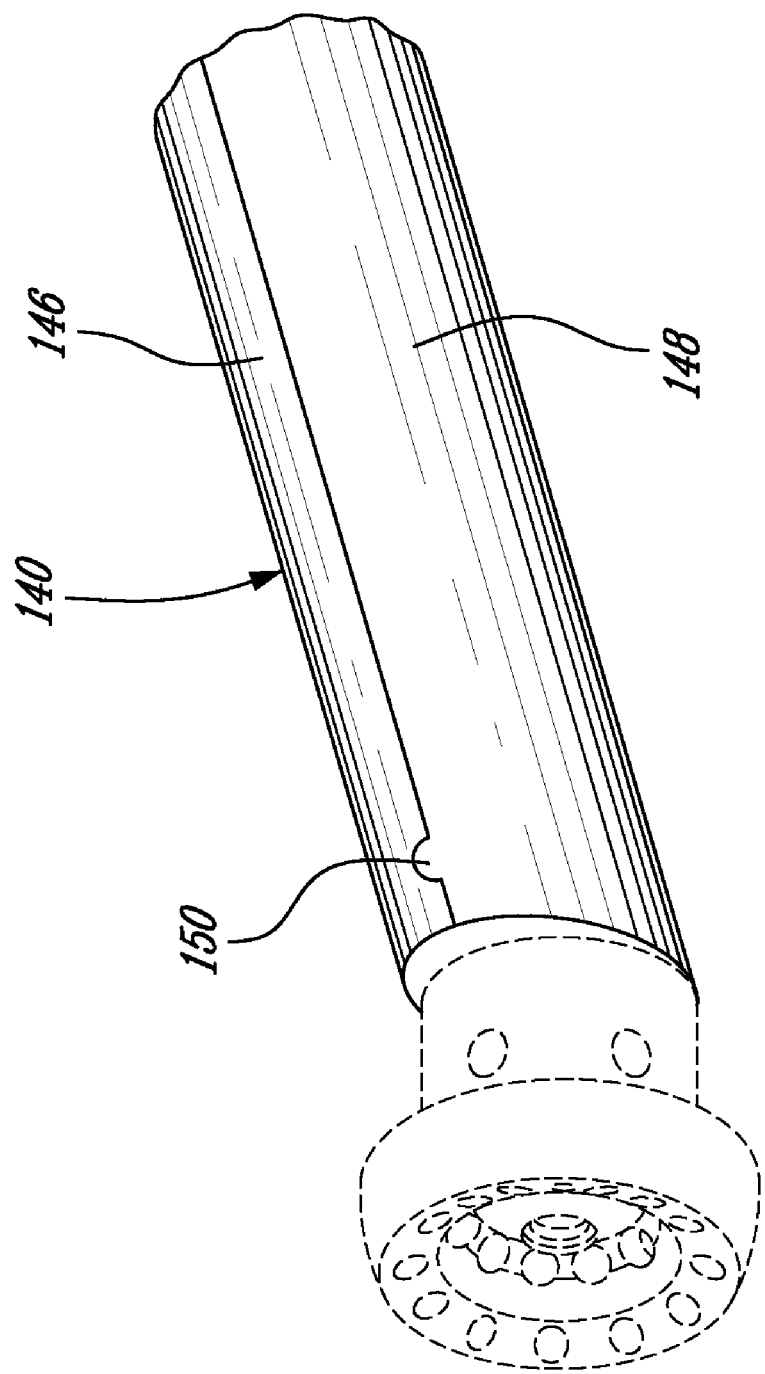

NOZZLE REPAIR TO REDUCE FRETTING

TECHNICAL FIELD

The application relates generally to a fuel nozzle for gas turbine engine and, more particularly, to such a fuel nozzle in which fretting is reduced.

BACKGROUND OF THE ART

Fuel nozzles generally include a stem portion having an inlet coupled to a fuel source and an outlet coupled to a spray tip assembly for spraying or atomizing fuel into the combustion chamber. The spray tip assembly is generally received through the combustor wall floating collar, and vibrations caused by the engine in use can cause friction between the spray tip assembly and the combustor wall floating collar, thus causing fretting of this element of the fuel nozzle. Fuel nozzles, or parts thereof undergoing fretting, generally need to be regularly replaced to compensate for this damage. Such replacements increase time and costs of maintenance of the engine.

SUMMARY

In one aspect, there is provided a method of repairing a fuel nozzle of a gas turbine engine to reduce fretting, the method comprising providing a fuel nozzle including a stem member having an inlet end for connection to a fuel supply, an outlet end for connection to a spray tip assembly and at least one fuel conduit defined therethrough in communication with the inlet and outlet ends, the stem member having a central portion extending between the inlet and outlet ends, determining a running frequency range of the gas turbine engine, and modifying a first natural frequency of the fuel nozzle such that it is outside the running frequency range of the gas turbine engine by attaching at least one stiffening element to an outer surface of the central portion of the stem member, the at least one stiffening element covering only part of a perimeter of the central portion and extending along only part of the length of the central portion, the at least one stiffening element being disposed adjacent the inlet end.

In another aspect, there is provided a method of repairing a fuel nozzle in a gas turbine engine to reduce fretting, comprising providing at least one stiffening element, each stiffening element being at least partially tapered and defining a thinner end and a thicker end, each stiffening element having a length smaller than that of a stem member of the fuel nozzle, and attaching each stiffening element to an outer surface of the stem member with the thicker end adjacent an inlet end of the stem member such that part of a perimeter of the stem member remains free of the at least one stiffening element, the at least one stiffening element having a size and shape selected such that a first natural frequency of the fuel nozzle with the at least one stiffening element attached thereto is outside a running frequency range of the gas turbine engine.

In a further aspect, there is provided a fuel nozzle for a gas turbine engine, the nozzle comprising a stem member having an inlet end for connection to a fuel supply and an outlet end for connection to a spray tip assembly, the stem member having a central portion extending between the inlet and outlet ends and including at least one fuel conduit extending therethrough in connection with the inlet and outlet ends, and at least one stiffening element mounted to an outer surface of the central portion, the at least one stiffening element extending around less than an entire perimeter of the central portion and across less than an entire length of the central portion, the at least one stiffening element being configured for increasing a natural frequency of the fuel nozzle by increasing an outer dimension of a longitudinal portion of the stem member adjacent the inlet end.

DESCRIPTION OF THE DRAWINGS

Reference is now made to the accompanying figures in which:

FIG. 5 is a schematic perspective view of part of a fuel nozzle with the stem member and heat shield shown in FIG. 4.

DETAILED DESCRIPTION

Figure 1:
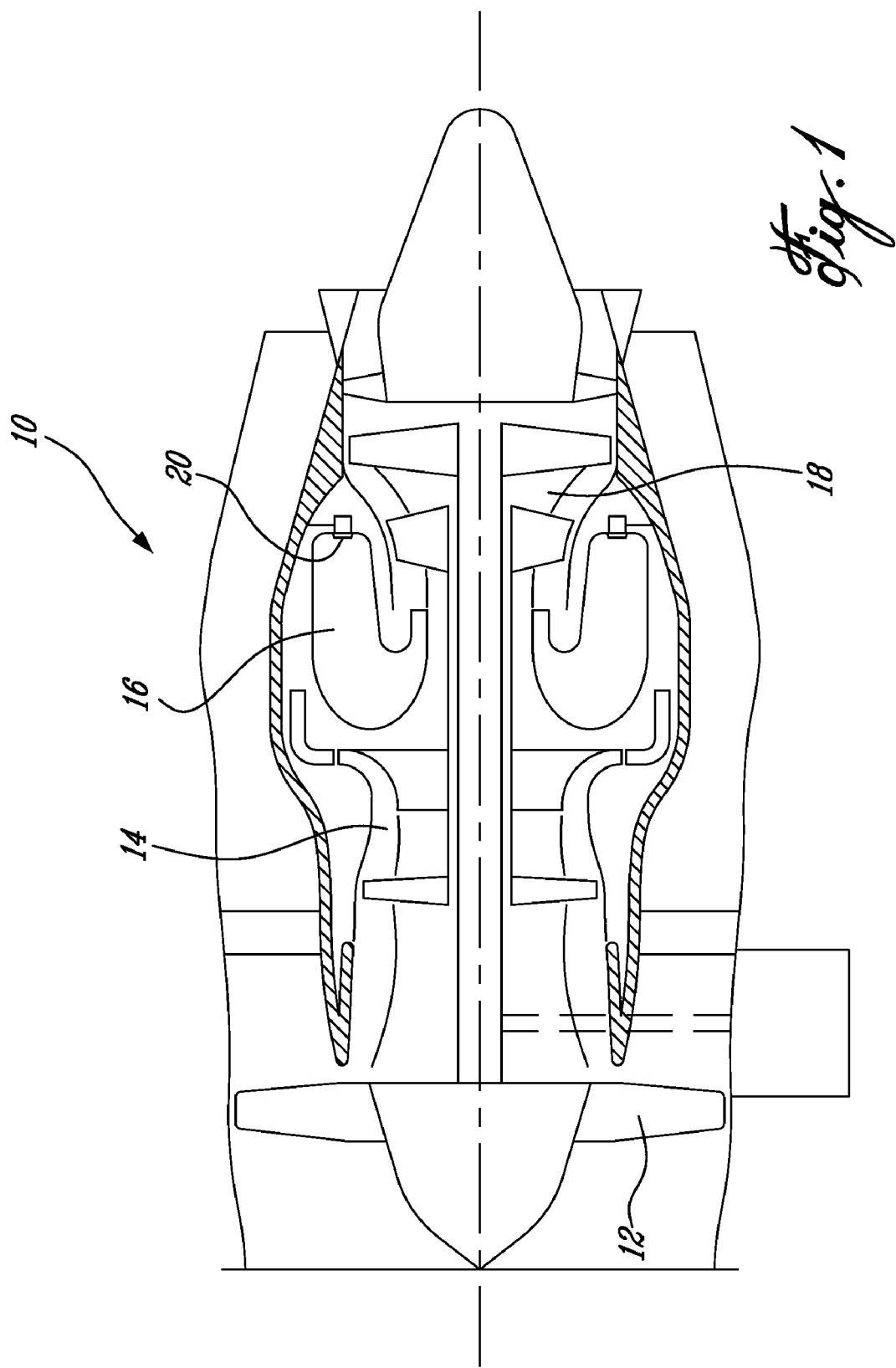
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

Figure 2:
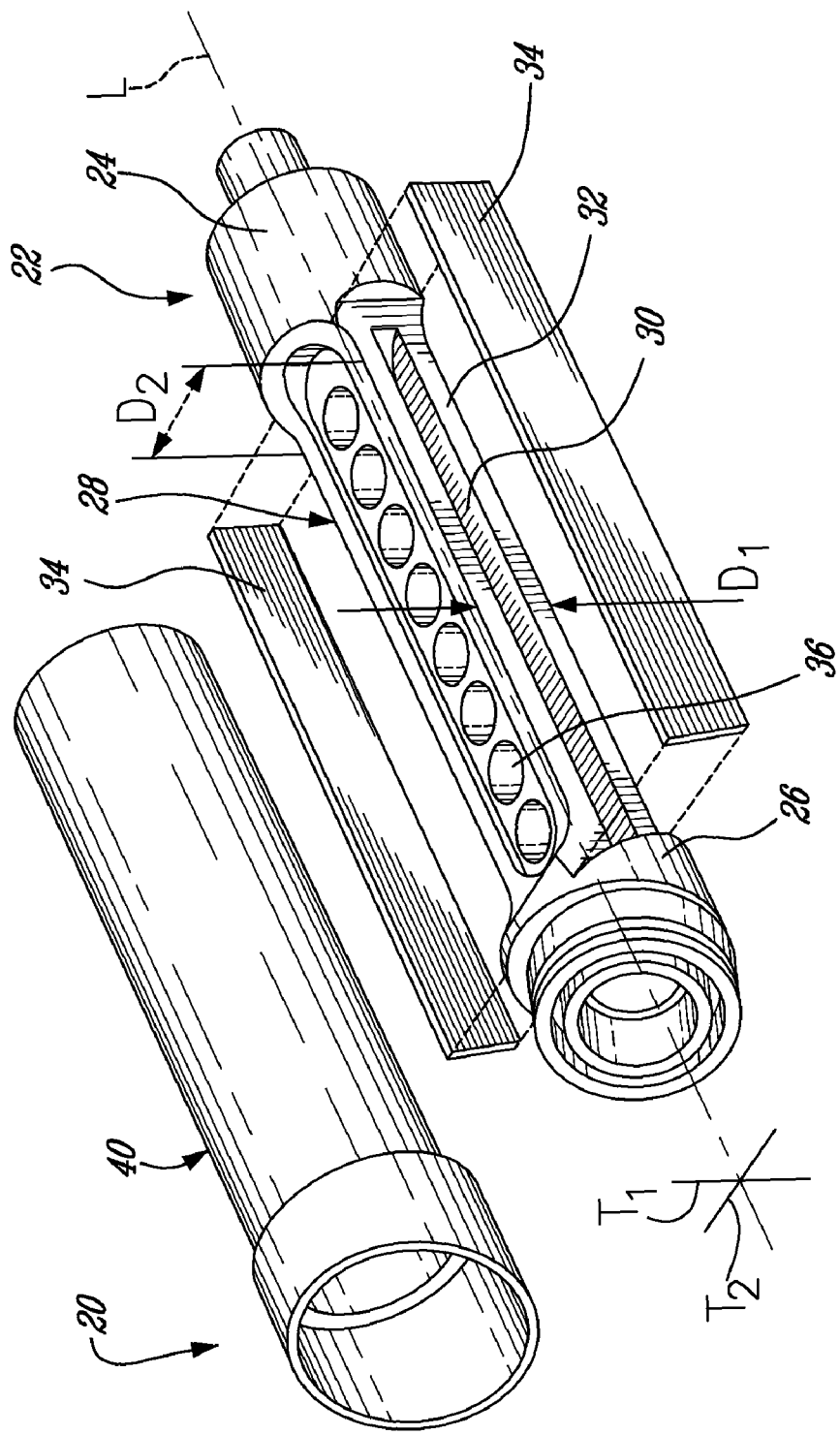
FIG. 2 is a perspective view of part of a fuel nozzle of the prior art.

FIG. 2 illustrates part of a fuel nozzle 20 of the prior art, for example such as shown in U.S. Pat. No. 6,141,968 which is incorporated herein in reference. The fuel nozzle 20 includes a stem member 22 having an inlet end 24 with one or more inlets for connection to a fuel supply (not shown), an outlet end 26 with one or more outlets for connection to a spray tip assembly (not shown), and a thinner central portion 28 extending therebetween. The stem member 22 is preferably formed as a single piece. Longitudinal slots 30 (only one of which is visible) are defined on opposite outer surfaces 32 of the central portion 28 of the stem member 22, each slot 30 being in communication with the inlet and outlet ends 24, 26. Each slot 30 is sealed by a respective cover plate 34, such that each slot 30 defines a fuel conduit through the stem member 22. Longitudinally aligned holes 36 are defined in the other opposite outer surfaces 33 of the central portion 28 of the stem member 22, i.e., between the two longitudinal slots 30, for lightening purposes. These holes 36 extend transversally with respect to the longitudinal axis L of the stem member 22. A tubular heat shield 40 is provided for protecting the stem member 22, and extends between outer surfaces of the inlet and outlet ends 24, 26.

In some instances, the first natural frequency of the fuel nozzle 20 partly illustrated in FIG. 2 may fall within the running frequency range of the gas turbine engine in which the fuel nozzle 20 is used, which is undesirable. As such, it is desirable to increase the first natural frequency of the fuel nozzle such that it is outside this running vibration range of the engine. As a common practice, the first natural frequency of the fuel nozzle should be higher than the engine rotor running frequency with an acceptable margin therebetween. Changing the first natural frequency of the fuel nozzle 20 away from the running range may advantageously reduce fretting, and as such the frequency at which portions of the fuel nozzle 20 need to be replaced.

Figure 3:
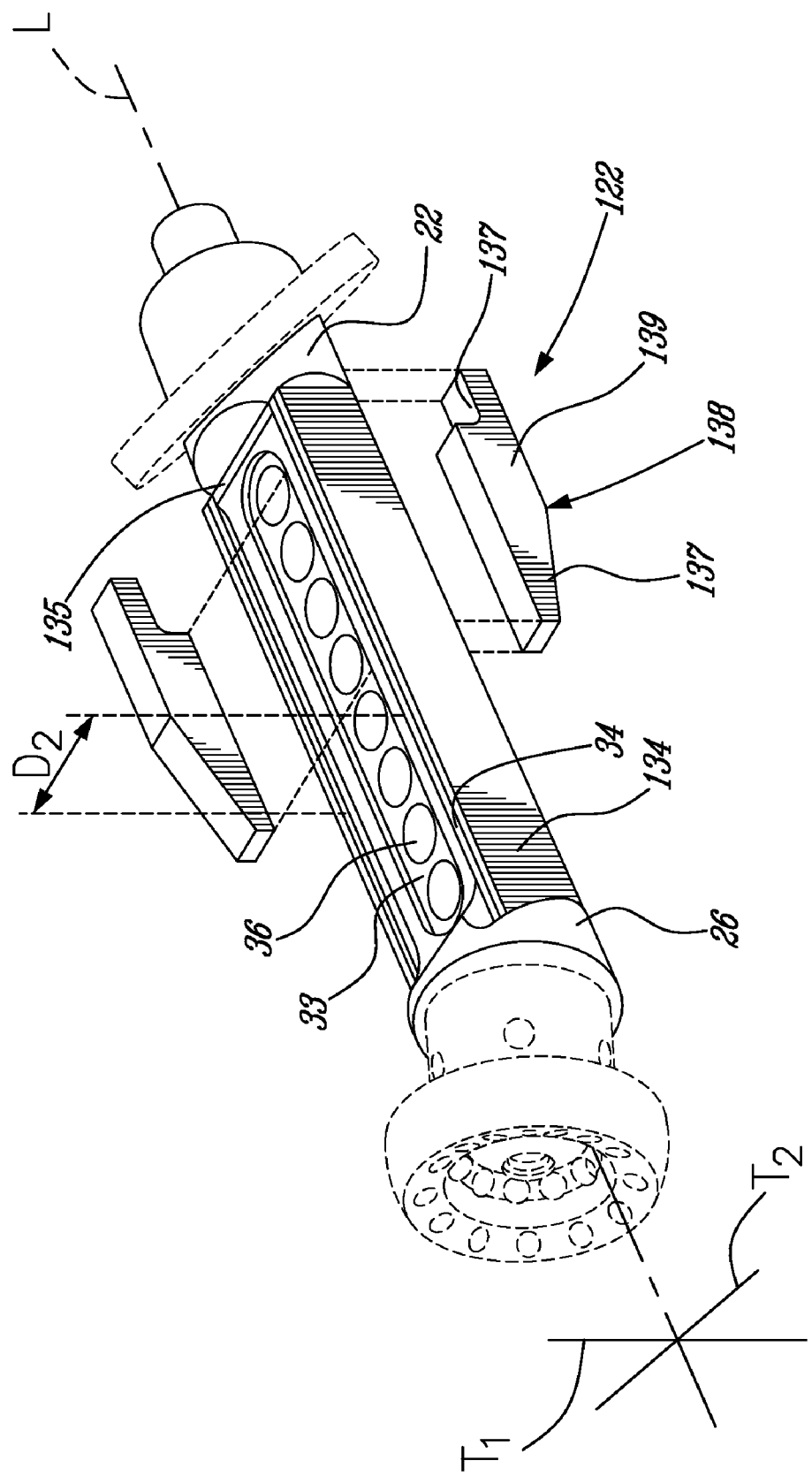
FIG. 3 is a perspective view of a modified stem member for a fuel nozzle which can be used in a gas turbine engine such as that shown in FIG. 1.

Reference is made to FIG. 3, where a modified stem member 122 for a fuel nozzle is shown. The modified stem member 122, when used in place of the first stem member 22, increases the first natural frequency of the fuel nozzle and as such brings the first natural frequency of the fuel nozzle outside of the running range of the engine.

The modified stem member 122 is an assembly which can be obtained through modifications of the first stem member 22, and as such elements of the first stem member 22 remaining unchanged are identified using the same reference numerals and will not be further described herein.

The modified stem member 122 includes, on each of the opposite outer surfaces 33 of the stem member 22 through which the holes 36 are defined, a stiffening element 138 attached thereto adjacent the inlet end 24. In the embodiment shown, each stiffening element 138 overlaps some of the holes 36 and includes a first portion 137 having a flat tapered profile with a minimal thickness defining the end of the stiffening element 138 furthest from the inlet end 24. Each stiffening element 138 also includes a second portion 139 having a substantially rectangular cross-section and extending between the inlet end 24 and the first portion 137, the second portion 139 having a step 141 defined therein. The step 141 is received in a corresponding step 135 machined on each of the outer surfaces 33 of the stem member 22, in a transition section between the inlet end 24 and the central portion 128. Alternately, and depending on the geometry of the outer surfaces 33 and of the stiffening elements 138, the machining of the steps 135 may be omitted. In the embodiment shown, the stiffening elements 138 have flat surfaces, facilitating the machining thereof. In a particular embodiment, the stiffening elements 138 are attached through brazing, for example by brazing the steps 135, 141 together and the first portion 137 to the outer surface 33 at or near the minimum thickness of the stiffening element 138.

Figure 4:
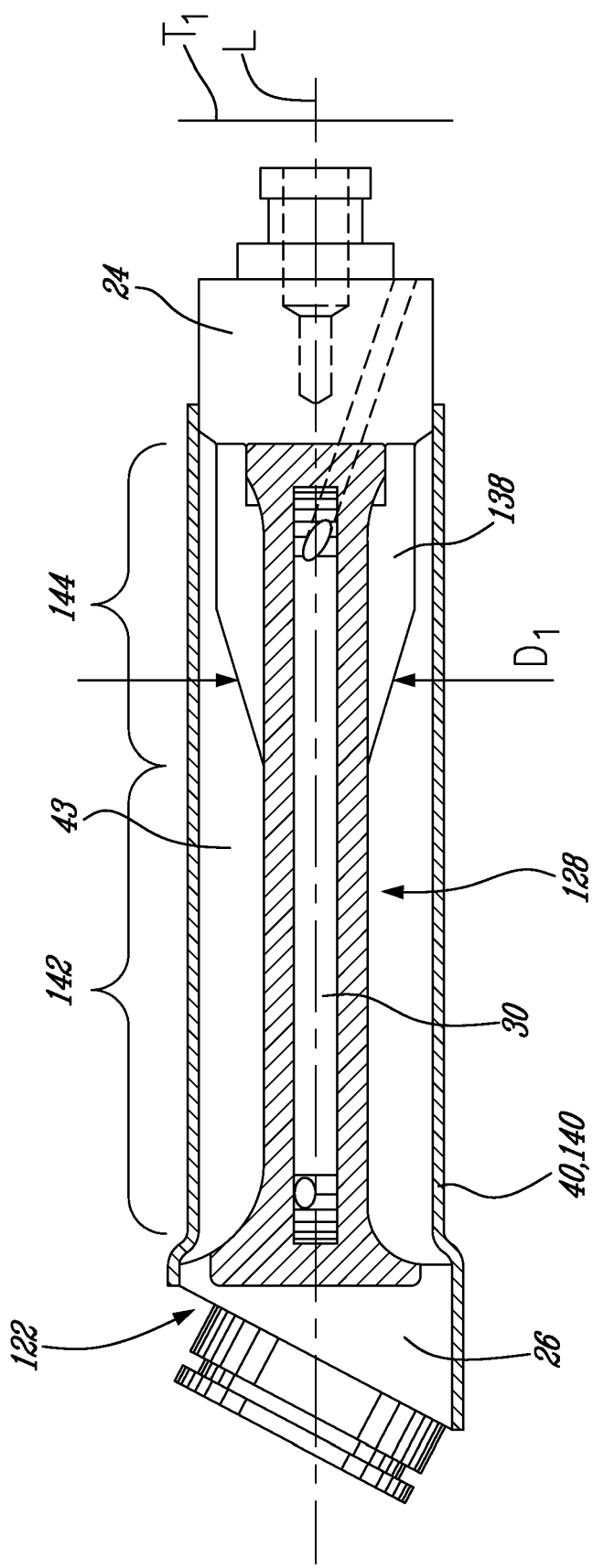
FIG. 4 is a side view of the stem member of FIG. 3 with a corresponding heat shield shown in cross-section.

As such, and referring to FIG. 4, a first part 142 of the central portion 128 of the modified stem member 122, which is defined adjacent the outlet end 126 and up to the stiffening elements 138, is similar or identical to that of the first stem member 22. A second part 144 of the central portion 128 of the modified stem member 122, where the stiffening elements 138 are present, has an increased mass with respect to that of the first stem member 22, thus causing an increased natural frequency for the modified stem member 122 and corresponding fuel nozzle.

Referring back to FIG. 3, two different transverse axes $T_1$, $T_2$ can be defined perpendicularly to the longitudinal axis L of each stem member 22, 122. In the embodiment shown, the central portion of each stem member 22, 122 has an at least substantially rectangular cross section, the two transverse axes $T_1$, $T_2$ are defined perpendicularly to each other, and the second transverse axis $T_2$ is defined perpendicularly to the opposed outer surfaces 32 of the stem member 22, 122 receiving the cover plates. However, in an alternate embodiment, the transverse axes $T_1$, $T_2$ can be defined non-perpendicularly to each other.

As such, a first outer dimension $D_1$ (see FIG. 4) of the central portions 28, 128 defined parallel to the first transverse axis $T_1$, which is preferably at least substantially constant across the length of the central portion 28 in the first stem member 22, is increased in the second part 144 of the central portion 128 of the modified stem member 122 by the stiffening elements 138. The second part 144 of the modified stem member 122 thus has a tapered shape, with a maximum thickness located adjacent the inlet end 24, thus allowing the weight increase of the modified stem member 122 when compared to the first stem member 22 to be minimized for a given increase in first natural frequency.

In the depicted embodiment, two identical or at least similar stiffening elements 138 are attached opposite one another such that the first outer dimension $D_1$ is increased at least substantially symmetrically with respect to the longitudinal axis L. However, it is also possible to employ two different stiffening elements 138, attached opposite each other, each stiffening element having a different size, weight and/or shape. Further, the specific location on the stem of the stiffening elements added (ex: by a retro-fit process for example) can also be varied, and the stiffening elements need not necessarily be disposed at the inlet end of the fuel nozzle stem.

In a particular embodiment, the length of the stiffening elements 138 is optimized to provide the necessary frequency increase with minimum weight increase. In one example, the length of the stiffening elements 138 corresponds to less than half the length of the central portion 128 of the stem member 122.

However, as the part of the perimeter of the central portion 128 of the modified stem member 122 defined by the outer surfaces 32 remains free of the stiffening elements 138, a second outer dimension $D_2$ (see FIG. 3) of the central portion 128 defined parallel to the second transverse axis $T_2$ remains the same as that of the first stem member 22, and in a particular embodiment, is at least substantially constant across the length of the central portion 128. Increasing the outer dimension of the stem member along only part of its perimeter further minimizes the weight increase for a given increase in natural frequency.

In a particular embodiment, additional cover plates 134 are attached over the cover plates 34 such as to increase the thickness of the cover plates on the modified stem member 122, to further increase the stiffness and the natural frequency of the fuel nozzle. For example, the additional cover plates 134 can have a same thickness as the first cover plates 34 such as to double the thickness of material covering the longitudinal slots 30.

As such, when the running frequency range of a gas turbine engine is determined and, the first natural frequency of the fuel nozzles of that gas turbine engine need to be changed, a modified stem member 122 can be obtained by modifying a stem member 22 of the fuel nozzle through the addition of the stiffening elements 138 along part of its perimeter near the inlet end as described above. The size and shape of the stiffening elements 138 is selected such that the first natural frequency of the fuel nozzle including the stem member 122 with the stiffening elements 138 attached thereto is outside the running frequency range. Design of the stiffening elements 138 can be done according to an iterative process, by verifying the first natural frequency of the fuel nozzle for example through experimentation, e.g. using strain gauge tests on fuel nozzles installed in the gas turbine engine, using adequate modeling software, and then modifying as required until such time as the measured, predicted and/or calculated first natural frequency of the fuel nozzle lies outside the undesirable range, that is the running frequency range of the engine.

Referring to FIG. 4, the size and shape of the stiffening elements 138 is preferably selected to allow the central portion 128 of the modified stem member 122 to remain contained inside the same envelope 43 defined by the heat shield 40 of the first stem member 22. In the embodiment shown, the heat shield 40 is tubular and extends between outer surfaces of the inlet and outlet ends 24, 26, and as such the size of the stiffening elements 138 is limited such that the central portion 128 of the modified stem member 122 does not extend outwardly beyond the inlet and outlet ends 24, 26. As such, the same heat shield 40, or a heat shield 140 with similar dimensions, can be installed around the modified stem member 122, and the first and modified stem members 22, 122 may appear identical once the heat shield 40, 140 is installed.

Referring to FIG. 5, in a particular embodiment, the heat shield 40 of the stem member 22 is removed and discarded prior to the attachment of the stiffening elements 138, and after the stiffening elements 138 are attached to form the modified stem member 122, a new heat shield 140 is installed around the stem member 122. The new heat shield 140 is composed of two longitudinal half sections 146, 148 which are interconnected, for example through brazing, prior to being attached, for example through brazing, to the stem member 122. The half sections 146, 148 include a tab and groove feature 150 which limits relative movement between the half sections 146, 148. The new heat shield preferably has similar or identical outer dimensions than the heat shield 40 previously removed from the stem member 22.

The above description is meant to be exemplary only, and one skilled in the art will recognize that changes may be made to the embodiments described without departing from the scope of the invention disclosed. For example, the stiffening elements 138 attached to the first stem member 22 can alternately be attached to different types of stem members, including, but not limited to, stem members having tubular fuel conduits defined therethrough, stem members having a different shape, and stem members which are integral with other portions of the fuel nozzle (e.g. the spray tip assembly). Various alternate sizes and configurations for the stiffening elements 138 can also be used. The stiffening elements can also be attached to the stem by any suitable fastening means, whether by welding, brazing or using mechanical fasteners, for example. Still other modifications which fall within the scope of the present invention will be apparent to those skilled in the art, in light of a review of this disclosure, and such modifications are intended to fall within the appended claims.

The invention claimed is:

1. A method of repairing a fuel nozzle of a gas turbine engine to reduce fretting, the method comprising:
   providing a fuel nozzle including a stem member having an inlet end for connection to a fuel supply, an outlet end for connection to a spray tip assembly and at least one fuel conduit defined therethrough in communication with the inlet and outlet ends, the stem member having a central portion extending between the inlet and outlet ends;
   determining a running frequency range of the gas turbine engine; and
   modifying a first natural frequency of the fuel nozzle such that it is outside the running frequency range of the gas turbine engine by attaching at least one stiffening element to an outer surface of the central portion of the stem member, the at least one stiffening element covering only part of a perimeter of the central portion and extending along only part of the length of the central portion, the at least one stiffening element being disposed adjacent the inlet end, including selecting a thickness for each said stiffening element such that the stem member with the at least one stiffening element attached thereto remains contained inside an envelope defined by a heat shield received around the stem member prior to attachment of the at least one stiffening element.

2. The method according to claim 1, further comprising, prior to attaching the at least one stiffening element, machining a corresponding step for each stiffening element on the outer surface of the central portion, and wherein each stiffening element is attached to the corresponding step.

3. The method according to claim 1, wherein the at least one stiffening element is attached to the outer surface through brazing.

4. The method according to claim 1, wherein the at least one stiffening element includes two stiffening elements attached to the central portion in opposite locations around the perimeter thereof.

5. The method according to claim 1, wherein each stiffening element is at least partially tapered such that each stiffening element includes a thinner end and a thicker end, each stiffening element being attached to the outer surface with the thicker end adjacent the inlet end of the stem member.

6. The method as defined in claim 1, wherein the stem member includes at least one longitudinal slot sealed by a cover plate to define one of the at least one fuel conduits, the cover plate being located in the remaining part of the perimeter free of the at least one stiffening element, and bringing the first natural frequency of the fuel nozzle outside the running frequency range includes attaching an additional cover plate over each cover plate.

7. The method as defined in claim 1, further comprising optimizing a length for each stiffening element such as to minimize a weight increase of the fuel nozzle brought by the at least one stiffening element.

8. The method as defined in claim 1, further comprising, prior to attaching the at least one stiffening element, removing a first heat shield from around the stem member, and after attaching the at least one stiffening element, interconnecting two heat shield pieces around the stem member to define a second heat shield around the stem member.

9. A method of repairing a fuel nozzle in a gas turbine engine to reduce fretting, comprising providing at least one stiffening element, each stiffening element being at least partially tapered and defining a thinner end and a thicker end, each stiffening element having a length smaller than that of a stem member of the fuel nozzle, and attaching each stiffening element to an outer surface of the stem member with the thicker end adjacent an inlet end of the stem member such that part of a perimeter of the stem member remains free of the at least one stiffening element, the at least one stiffening element having a size and shape selected such that a first natural frequency of the fuel nozzle with the at least one stiffening element attached thereto is outside a running frequency range of the gas turbine engine.

10. The method according to claim 9, wherein the at least one stiffening element includes two stiffening elements attached in opposite locations around the perimeter of the stem member.

11. The method as defined in claim 9, further comprising selecting a thickness for each said stiffening element such that the stem member with the at least one stiffening element attached thereto remains contained inside an envelope defined by a heat shield received around the stem member prior to attachment of the at least one stiffening element.

12. A fuel nozzle for a gas turbine engine, the nozzle comprising a stem member having an inlet end for connection to a fuel supply and an outlet end for connection to a spray tip assembly, the stem member having a central portion extending between the inlet and outlet ends and including at least one fuel conduit extending therethrough in connection with the inlet and outlet ends, a heat shield being defined around the stem member, and at least one stiffening element mounted to an outer surface of the central portion, the at least one stiffening element extending around less than an entire perimeter of the central portion and across less than an entire length of the central portion, the at least one stiffening element being configured for increasing a natural frequency of the fuel nozzle by increasing an outer dimension of a longitudinal portion of the stem member adjacent the inlet end, the stem member and the at least one stiffening element mounted thereto remaining contained within an envelope defined by the heat shield around the stem member.

13. The fuel nozzle as defined in claim 12, wherein the at least one stiffening element has a greater thickness at a first end thereof adjacent the inlet end than at a second end thereof away from the inlet end.

14. The fuel nozzle as defined in claim 13, wherein the at least one stiffening element has a first flat tapered portion extending from the second end and a second portion extending between the first portion and the first end and having an at least substantially rectangular cross-section.

15. The fuel nozzle as defined in claim 12 wherein the at least one stiffening element includes two stiffening elements attached in opposite locations around the perimeter of the central portion.

16. The fuel nozzle as defined in claim 12, wherein transverse dimensions of the inlet and outlet ends are greater than transverse dimensions of an assembly including the stem member and the at least one stiffening element attached thereto.

17. The fuel nozzle as defined in claim 12, wherein the central portion includes two opposed flat surfaces extending along at least a substantial portion of the length thereof, and a plurality of openings defined through the central portion from one of the flat surfaces to the others, the at least one stiffening element including one stiffening element attached to each of the flat surfaces and covering at least one of the holes.

18. The fuel nozzle as defined in claim 12, wherein each stiffening element is received in a corresponding step defined in a transition section between the inlet end and the central portion.

19. The fuel nozzle as defined in claim 12, wherein a length of each stiffening element is less than half the entire length of the central portion.

* * * * *